United States Patent [19]

D'Angelo et al.

[11] 4,041,598

[45] Aug. 16, 1977

[54] PNEUMATICALLY OPERATED STAPLING APPARATUS AND METHOD

[76] Inventors: Joseph J. D'Angelo, 378 Annette Court, Wycoff, N.J. 07481; Joseph J. D'Angelo, Jr., 53 Iroquois Ave., Oakland, N.J. 07536

[21] Appl. No.: 701,427

[22] Filed: June 30, 1976

[51] Int. Cl.$^2$ .............................................. B23P 11/00

[52] U.S. Cl. .......................................... 29/432; 91/5; 91/52; 137/625.69; 227/5; 227/7; 227/130

[58] Field of Search ...................... 29/432; 227/130, 5, 227/6, 7; 137/625.69; 91/52, 5

[56] References Cited

U.S. PATENT DOCUMENTS

| | | | |
|---|---|---|---|
| 3,208,353 | 9/1965 | Wandel | 91/52 |
| 3,259,292 | 7/1966 | Maynard | 227/130 X |
| 3,352,471 | 11/1967 | Fisher | 227/7 |
| 3,408,897 | 11/1968 | Hoen et al. | 91/5 |
| 3,599,854 | 8/1971 | Pearson | 227/7 |
| 3,803,698 | 4/1974 | Schmidt | 227/130 X |
| 3,929,161 | 12/1975 | Boelkins | 137/626.69 |

*Primary Examiner*—Victor A. DiPalma
*Attorney, Agent, or Firm*—Parmelee, Johnson & Bollinger

[57] ABSTRACT

A pneumatically operated stapling apparatus and method for driving a staple into a workpiece whenever the workpiece is moved into a stapling position between a staple driver and a backing member. The method and apparatus are particularly suited for stapling difficult to handle workpieces of the type including a panel and a sheet of flexible material to be mounted thereon, and the method and apparatus are able to advantageously use a pneumatic stapling gun of a known type having a staple driving mechanism controlled by a valve plunger positionable either to advance the staple driver toward the backing member, or to retract the staple driver. A trigger element is positioned to be depressed by the workpiece as it is placed in the stapling position, and a pneumatic control means, actuated by depressing the trigger element, first positions the stapler control valve to cause the staple driver to advance and insert a staple into the workpiece and then, while the trigger element remains depressed, automatically changes the position of the stapler control valve to retract the staple driver away from the workpiece to thereby permit the workpiece to be removed from the stapling position to release the trigger element. The pneumatically operated stapling apparatus frees the hands for manipulation of the workpiece, e.g., for accurate placement of a sheet of material on a mounting panel, and allows a known reliable type of pneumatic stapler to be inexpensively adapted to perform a valuable new function.

The pneumatic control means in the stapling apparatus and method comprises a pneumatic reservoir, a pneumatic actuator coupled to the stapler control valve to control the positioning thereof, and a valve connected to the trigger element. The valve connects the pneumatic air supply to the pneumatic reservoir when the trigger element is not depressed, and then connects the pneumatic reservoir, with its stored charge of compressed air, to the pneumatic actuator when the trigger element is depressed. The pneumatic circuit formed by the pneumatic reservoir and pneumatic actuator includes leakage means for reducing the pressure therein to restore the pneumatic actuator to its initial position to thereby revert the stapler control valve to its initial position for retraction of the staple driver. The pneumatic control means may include means to adjust the storage volume of the reservoir, and means to adjust the rate of leakage therefrom.

18 Claims, 6 Drawing Figures

PNEUMATICALLY OPERATED STAPLING APPARATUS AND METHOD

BACKGROUND OF THE INVENTION

1. Field of the Invention

This invention relates to fastening apparatus and methods, and more particularly to pneumatically powered stapling methods and apparatuses.

2. Description of the Prior Art

A recurring fastening problem is that presented by the need to mount a sheet of flexible material such as fabric upon a mounting panel or frame. Typical examples of this fastening problem arise in the mounting of handwork, such as crewel work, upon a display panel, mounting of artist's canvas upon stretcher frames, or in the mounting of artists's canvas upon stretcher frames, or in the mounting or decorative fabric or posters upon frames. In each situation, the respective pieces must be held in alignment while being fastened together, and it is very difficult to simultaneously maintain alignment, usually under a certain amount of stretching tension, while inserting fasteners through the sheet of material into the mounting panel or frame. The use of machine powered magazine fed fasteners such as staples would be desirable for convenience and speed and because of the uniform gripping force this would provide. However, known staplers and stapler actuating techniques are not suited for workpieces of the type described since they either require the use of the hands in actuation, thereby making it difficult to align and tension the material, or they require the use of another part of the body for actuation, with the result that fastening is slow, or awkward, or uncomfortable, or difficult to coordinate. Moreover, it would be preferable to use known stapling mechanism with proven reliability and availability at low cost through mass manufacture. In particular, it would be highly desirable to use a pneumatic stapler mechanism of the type commonly used in staple guns mounting insulation or acoustic tiles or the like, and having a finger operated control valve positionable either to connect the pneumatic air supply to the staple driving mechanism to advance the staple driver, or to block the air supply and to retract the staple driver. Heretofore, no satisfactory way has been found for resolving these problems and for inexpensively realizing a reliable and safe method and apparatus suitable for convenient and rapid use with a workpiece such as a hand held panel and a sheet of material to be mounted thereon.

SUMMARY OF THE INVENTION

The principal object of the present invention is to provide an improved pneumatically operated stapling apparatus and method for inserting the staple into a workpiece such as a hand held panel and a sheet of material to be mounted thereon. Further objects of the invention are to provide such a method and apparatus which is convenient and rapid to use, not requiring the use of the hands for actuation, which is inexpensive to make, being able to incorporate a pneumatic stapler mechanism of a known readily available type, and which is adaptable to a variety of tasks and safe to use. Still another object of the present invention is to provide a pneumatically operated stapling device more suitable for commercial use.

In a preferred embodiment of the invention to be described hereinbelow in detail, the pneumatically operated stapling method and apparatus are arranged to insert a staple into the workpiece whenever the workpiece is placed in a stapling position between a staple driver and a backing member. The staple driver is supplied by a pneumatic stapler of the known type having a staple driving mechanism controlled by a valve positionable either to connect the pneumatic air supply to the staple driving mechanism to advance the staple driver, or to block the air supply and to retract the staple driver. A trigger element is positioned to be depressed by the workpiece as it is placed in the stapling position, and a pneumatic control means, actuated by depression of the trigger element, first positions the stapler control valve to cause the staple driver to advance and insert a staple into the workpiece, and then while the trigger element remains depressed, automatically changes the position of the stapler control valve to retract the staple driver from the workpiece and to permit the workpiece to be removed from the stapling position to release the trigger element and make it ready to be depressed again in a new cycle of operation.

In another aspect of the invention, the pneumatic control means comprises a pneumatic reservoir, a pneumatic actuator such as a spring biased piston coupled to the stapler control valve to control the positioning thereof, and a valve connected to the trigger element and arranged to connect the compressed air supply to the reservoir when the trigger element is not depressed, and to connect the reservoir with the actuator when the trigger element is depressed. Accordingly, the reservoir receives a charge of compressed air which is fed to the pneumatic actuator when the trigger element is depressed. The pneumatic circuit formed by the reservoir and actuator includes leakage means for reducing the pressure therein to reset the actuator and thereby change the position of the stapler control valve to retract the staple driver. The pneumatic reservoir may include a tube with means to adjust the volume of the tube. Preferably, the pneumatic actuator is connected to the valve through a tube, and the leakage means includes an aperture in the tube adjacent the valve. Means may be provided for adjusting the rate of leakage to vary the amount of time taken to reset the stapler apparatus.

In more detailed aspects of the invention, the pneumatic stapler mechanism is positioned to drive staples upwardly into the bottom edge of a workpiece, so that a sheet of material on the face of a mounting panel will be visible during fastening. The stapler mechanism is secured to a frame, and the backing member is adjustably secured to the frame to vary the distance between the staple driver and backing member to accommodate different panel thicknesses. The trigger element, also attached to the frame, is positioned to be depressed by the edge of the workpiece as it is moved horizontally into the space between the staple driver and backing member.

Other objects, aspects and advantages of the invention will be pointed out in, or apparent from, the detailed description hereinbelow, considered together with the following drawings.

DESCRIPTION OF THE PREFERRED EMBODIMENTS

Figure 1:
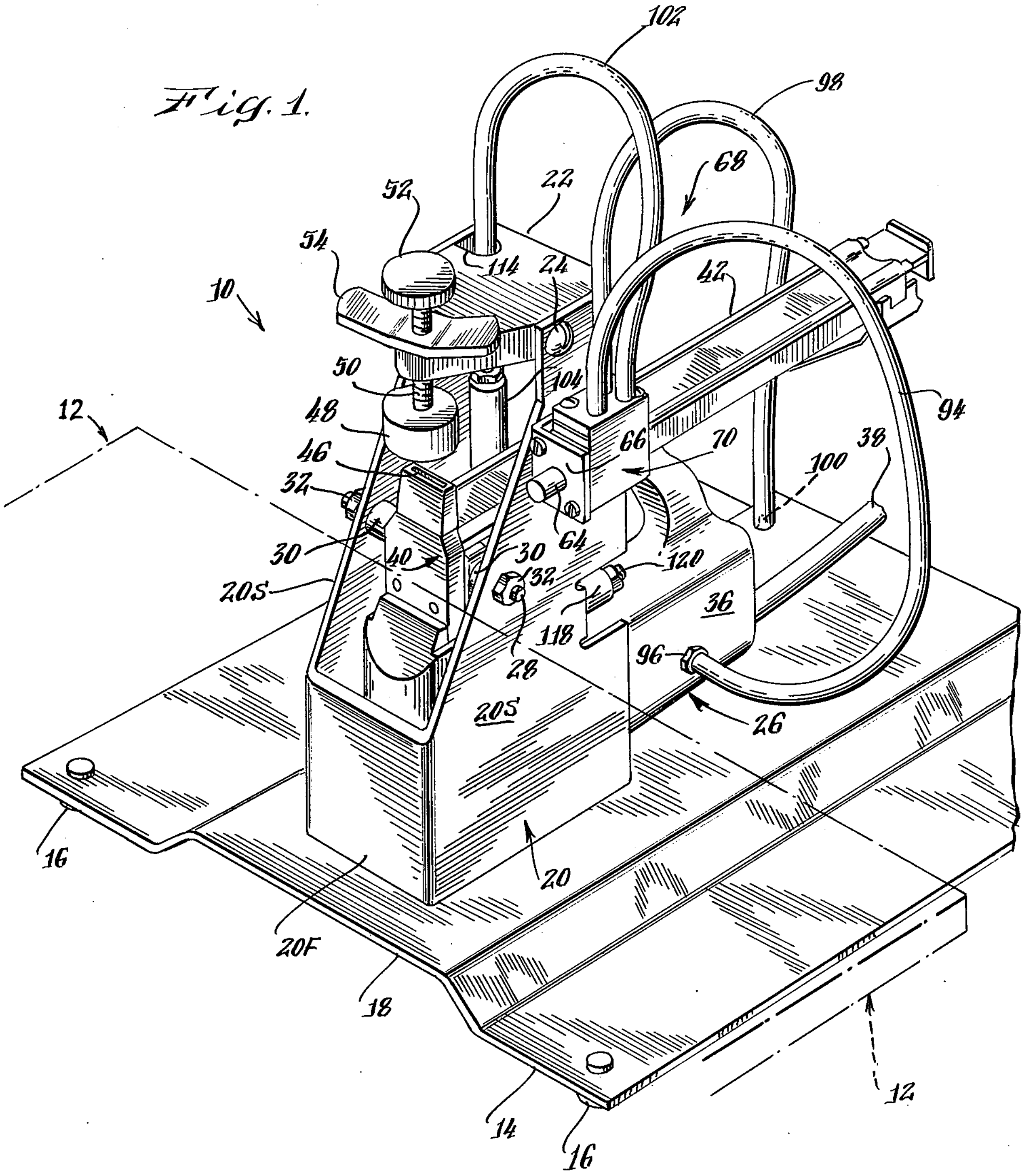
FIG. 1 is a perspective view illustrating a pneumatically operated stapling apparatus in accordance with the present invention.
Figure 3:
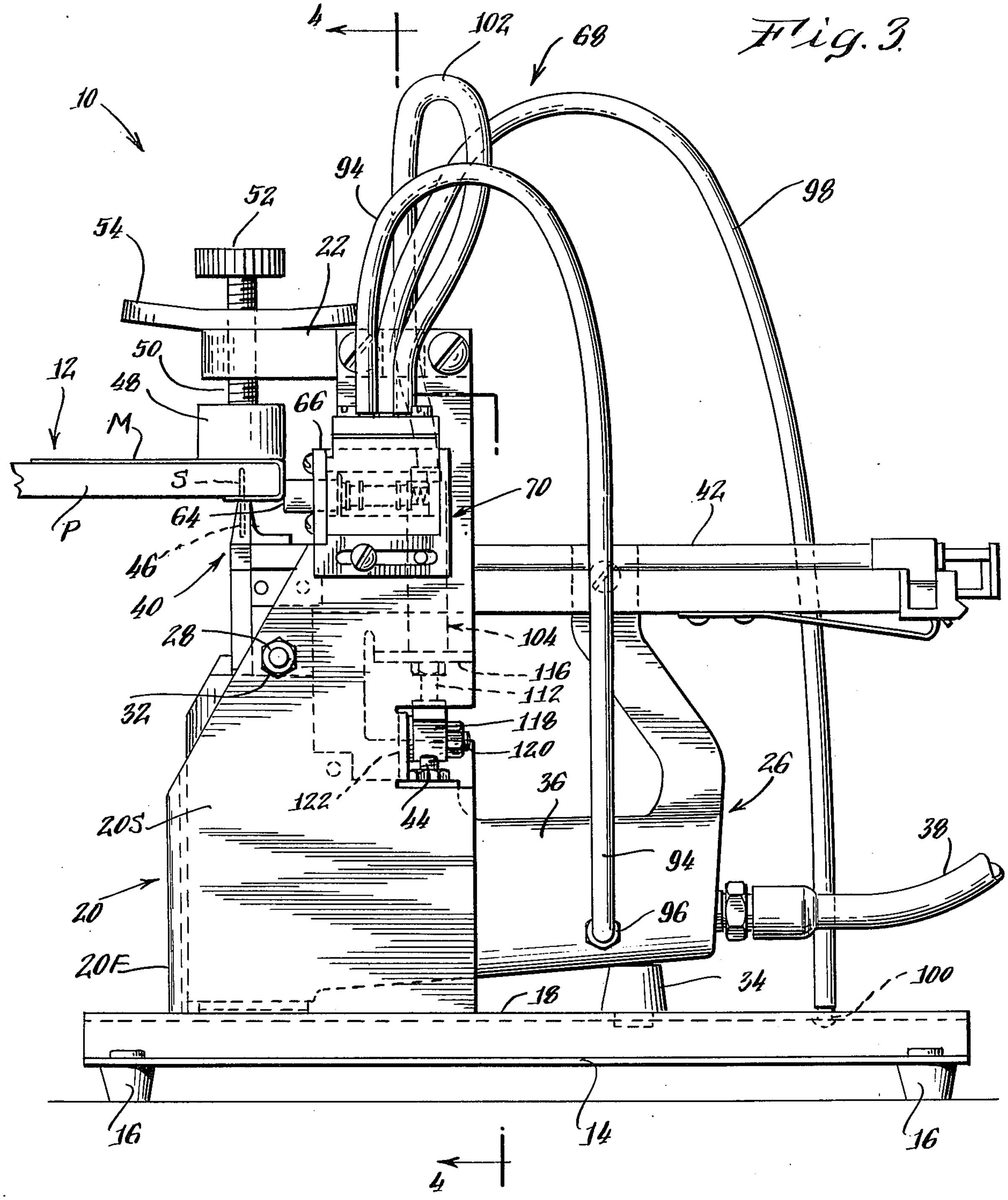
FIG. 3 is a side elevational view of the stapling apparatus of FIG. 1.

FIG. 1 illustrates a pneumatically operated stapling apparatus 10 constructed in accordance with the present invention and arranged to insert one or more staples in the underside of a workpiece 12 (shown is dashed lines). The workpiece 12, is shown in FIG. 3, which includes a hand held frame or panel P and a sheet of flexible material M positioned over the face of the panel, around the outer edge, and across a portion of the bottom surface of the panel, with a staple S to be inserted into the bottom surface of the panel through the material M.

As illustrated in FIG. 1, the stapling apparatus 10 comprises a base plate 14 carrying rubber pads 16 and having a raised central pedestal 18. Secured to pedestal 18, by welding for example, is a U-shaped frame 20 with a front wall 20F and two side walls 20S. An upper frame plate 22 is secured between the two side walls 20S with bolts 24.

A pneumatic stapler 26, of a commercially available type, rests on base plate 14 and is secured to the side walls 20S of frame 20 by means of a through bolt 28, spacers 30, and nuts 32. A rubber pad 34 (see FIG. 3) may be used to support raised portions of the pneumatic stapler 26.

The pneumatic staple 26, which is for example a stapler of the type manufactured by Cenco Products Incorporated, Cincinnati, Ohio model number JG ½ BL comprises a body 36 connected to a pressurized air supply hose 38 and to a staple driving mechanism 40 which receives staples from magazine 42 and drives them, e.g., into a workpiece 12, whenever control valve plunger 44 is depressed. Plunger 44, intended ordinarily to be depressed by a finger, positions a control valve either to connect the pressurized air supply to the staple driving mechanism 40 to advance a staple driver 46 therein upwardly, or, when released, to block the air supply and to retract the staple driver 46. Accordingly, in the customary operation of pneumatic stapler 26, the plunger 44 must be released in order to retract staple driver 46.

Positioned above staple driving mechanism 40 is a backing member 48 on a post 50 threadably engaging frame plate 22 and terminating in a knurled adjustment knob 52. Also threadably engaging post 50 is a wing nut 54 functioning as a lock nut to secure backing member 48 at the desired vertical height appropriate to the thickness of the workpiece 12 which is to be stapled.

Figure 2:
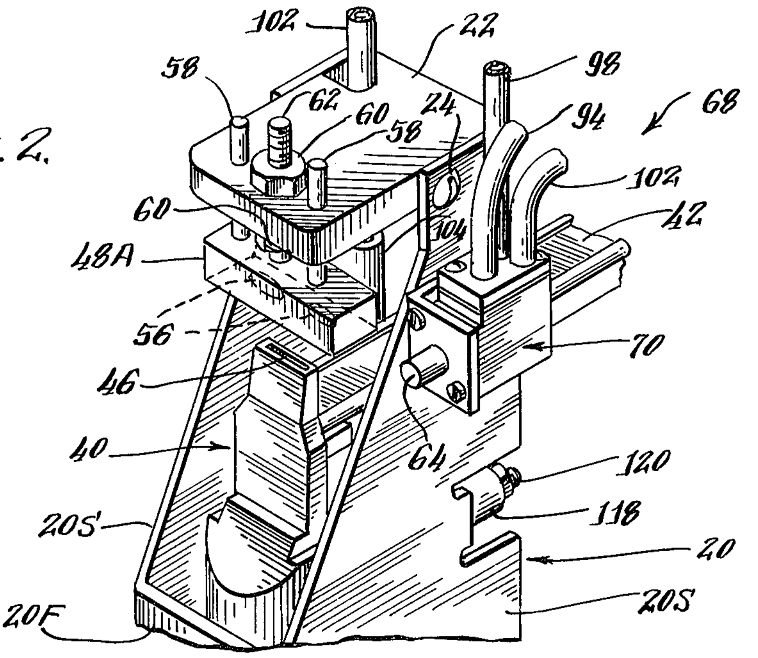
FIG. 2 is a partial perspective view similar to FIG. 1 illustrating a modified form of backing member.

As illustrated in FIG. 2, the backing member may take the form of an anvil 48A with crimping depressions 56 in the bottom surface thereof to crimp the ends of a staple, and carrying guide rods 58 slidably engaging frame plate 22 and being secured at the appropriate height by lock nuts 60 on a threaded post 62 extending through a hole in frame plate 22.

In accordance with the present invention, a staple is inserted into the workpiece 12 whenever the workpiece is placed in a stapling position between the staple driver 46 and backing member 48 or 48A. As the workpiece 12 is moved into stapling position, the edge of the workpiece depresses a trigger element 64 located in a horizontal plane at the top of staple driving mechanism 40 (see FIG. 3) and mounted by means of an angle bracket 66 fastened to a side wall 20S of frame 20.

As explained previously, the pneumatic stapler 26 is actuated by depressing plunger 44 to advance staple driver 46, and by releasing plunger 44 to retract staple driver 46. The trigger element 64, when depressed by workpiece 12, actuates a pneumatic control assembly 68 which is coupled to valve plunger 44 and is arranged to first depress the plunger 44 to cause the staple driver 46 to advance and insert a staple into the workpiece 12, and then, while the trigger element 64 remains depressed, to automatically release valve plunger 44 to retract the staple driver 46 away from the workpiece. This permits the workpiece to be removed from the stapling position to release the trigger element 64 and reposition it for a subsequent cycle of use. The pneumatic control assembly 68 thus performs the function of releasing the workpiece 12 from the grip of the staple driver 46 and backing member 48 without requiring the operator to do anything. Accordingly, it is possible to insert a succession of staples around the edge of the workpiece 12 in a rapid fashion merely by (1) placing the workpiece in stapling position to depress trigger element 64 and drive a staple, (2) retracting the workpiece from the stapling position and moving it to right or left until the next location for insertion of a staple is reached, and then (3) again placing the workpiece in stapling position to depress trigger element 64.

Figure 5:
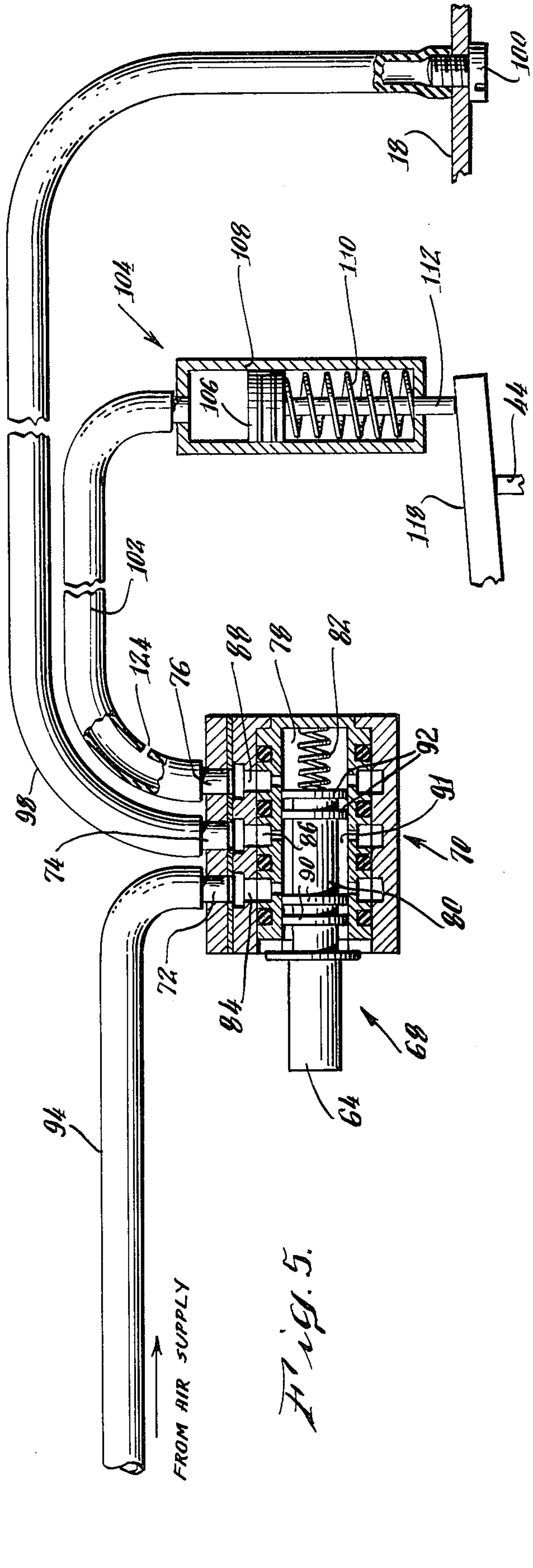
FIG. 5 is a sectional view of the pneumatic control means for the stapling apparatus of FIG. 1.

In accordance with the present invention, the pneumatic control assembly 68, which is shown in isolation and in greater detail in FIG. 5, comprises a two position slide valve 70 connected to the trigger element 64 and having three access ports 72, 74 and 76 to an interior chamber 78 fitted with a slidable valve piston or spool valve 80 biased by a spring 82 and connected to trigger element 64. Spring 82 urges valve piston 80 and trigger element 64 outwardly, so that the resistance of spring 82 must be overcome when trigger element 64 is depressed. As shown in FIG. 5, the access ports 72, 74 and 76 lead to annular chambers 84, 86 and 88 respectively which communicate with chamber 78. The valve piston 80 is provided with spaced pairs of sealing flanges 90 and 92 which define an annular clearance space 91 between them. This space 91 provides communication between access ports 72 and 74 when valve piston 80 and trigger element 64 are in their outward position (shown in FIG. 5), and provides communication between access ports 74 and 76 when trigger element 64 is depressed.

Figure 4:
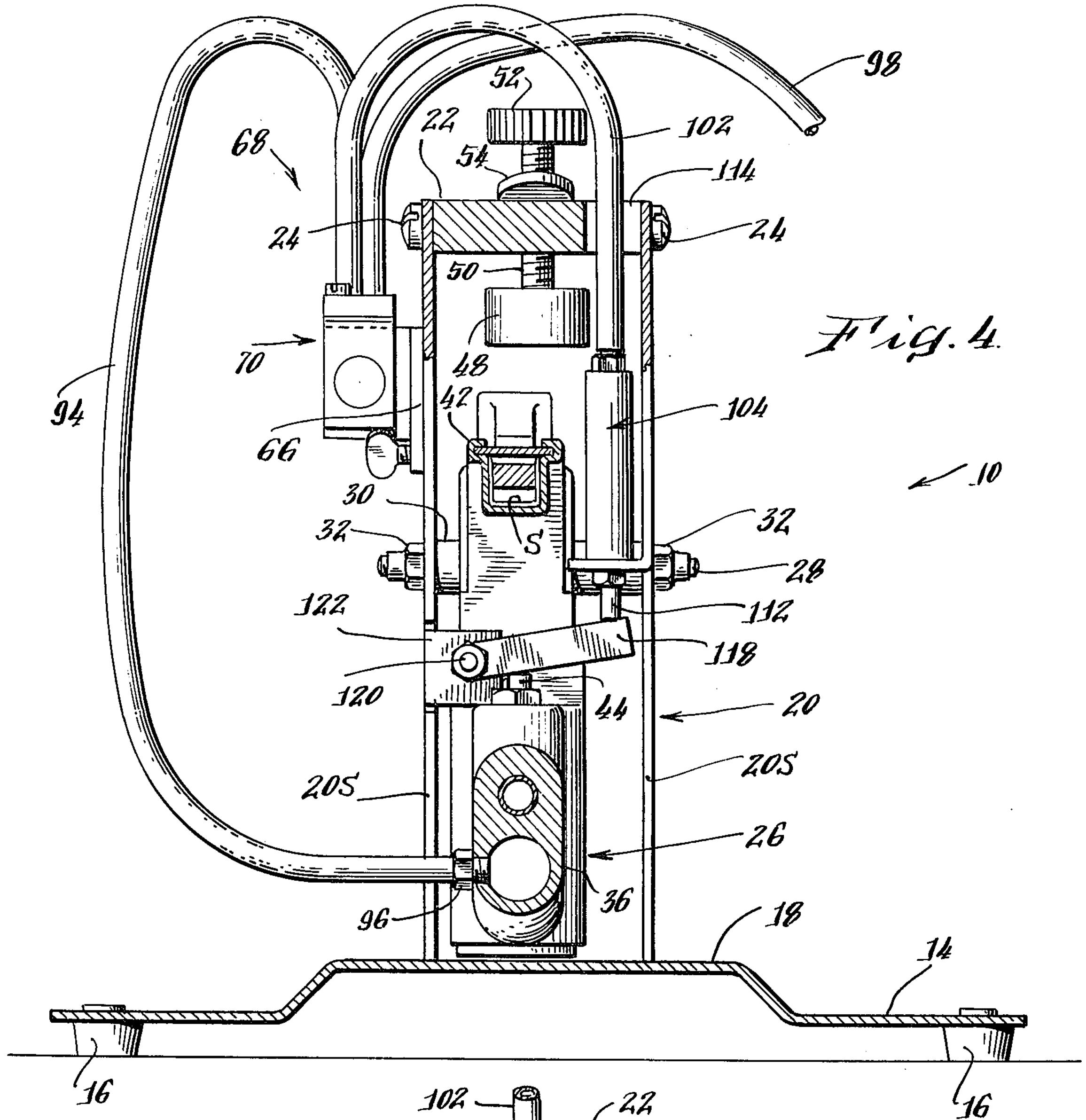
FIG. 4 is a section on line 4—4 of FIG. 3.

The access port 72 is connected by means of a tube 94 to the compressed air supply, preferably by means of a fitting 96, as shown in FIGS. 1, 3 and 4, tapped into the body 36 of pneumatic stapler 26.

Access port 74 is connected to a length of tubing 98 forming a pneumatic reservoir for storage of a charge of compressed air admitted when slide valve 70 is in the position shown in FIG. 5. The end of tube 98 may be closed by fitting it over a stud formed by a screw 100 fitted through the center portion 18 of base plate 14.

Access port 76 is connected through a tube 102 to a pneumatic actuator 104 comprising an internal piston 106 slidable within a housing 108 against the resistance of a spring 110 and being connected to a rod 112 which advances outwardly from housing 108 when compressed air is introduced into the pneumatic actuator 104. As shown in FIGS. 3 and 4, the tube 102 extends through an opening 114 in frame plate 22, and the pneumatic actuator 104 is mounted upon a bracket 116 folded inwardly from a frame side wall 20S. The rod 112 slides vertically and makes contact with a lever 118 pivoted about a horizontal bolt 120 mounted on a bracket 122 folded inwardly from frame sidewall 20S. The lever 118 is positioned to make contact wih the valve plunger 44 of pneumatic stapler 26, and therefore the pneumatic actuator 104, by reciprocation of rod 112, is able to control the position of valve plunger 44 and thereby control the advancing and retracting movements of staple driver 46.

As shown in FIG. 5, the tube 102 leading from slide valve 70 to the pneumatic actuator 104 is provided with a leakage aperture 124 located adjacent the valve.

The operation of pneumatic control assembly 68 is as follows. When trigger element 64 extends outwardly, as shown in FIG. 5, slide valve 70 admits a charge of compressed air into the pneumatic reservoir formed by tube 98. As the workpiece is moved into stapling position, and trigger element 64 is depressed causing the slide valve 70 first to cut off the supply of compressed air through access ports 72 and then connect access ports 74 and 76 together so that the charge of compressed air stored in reservoir tube 98 rapidly travels through tube 102 to the pneumatic actuator 104. The arrival of the charge of compressed air in pneumatic actuator 104 causes piston 106 and rod 112 to move against the resistance of spring 110, thereby to pivot lever 118 and depress valve plunger 44. Staple driver 46 advances, drives a staple S into workpiece 12, and grips workpiece 12 against backing member 48. While the trigger element 64 remains depressed, the charge of compressed air in tubes 98 and 102 leaks at a predetermined rate through leakage aperture 124, thereby reducing the force on piston 106 and allowing spring 110 to raise rod 112. Lever 118 and valve plunger 44 return to their initial positions blocking the air supply to staple driving mechanism 40 and retracting the staple driver 46. The workpiece 12 then may be removed from the stapling position, allowing spring 82 to return trigger element 64 to the ready position shown in FIG. 5. Connection between the compressed air supply and the pneumatic reservoir tube 98 is restored, admitting a new charge of compressed air to the reservoir for use in the next cycle of operation.

Figure 6:
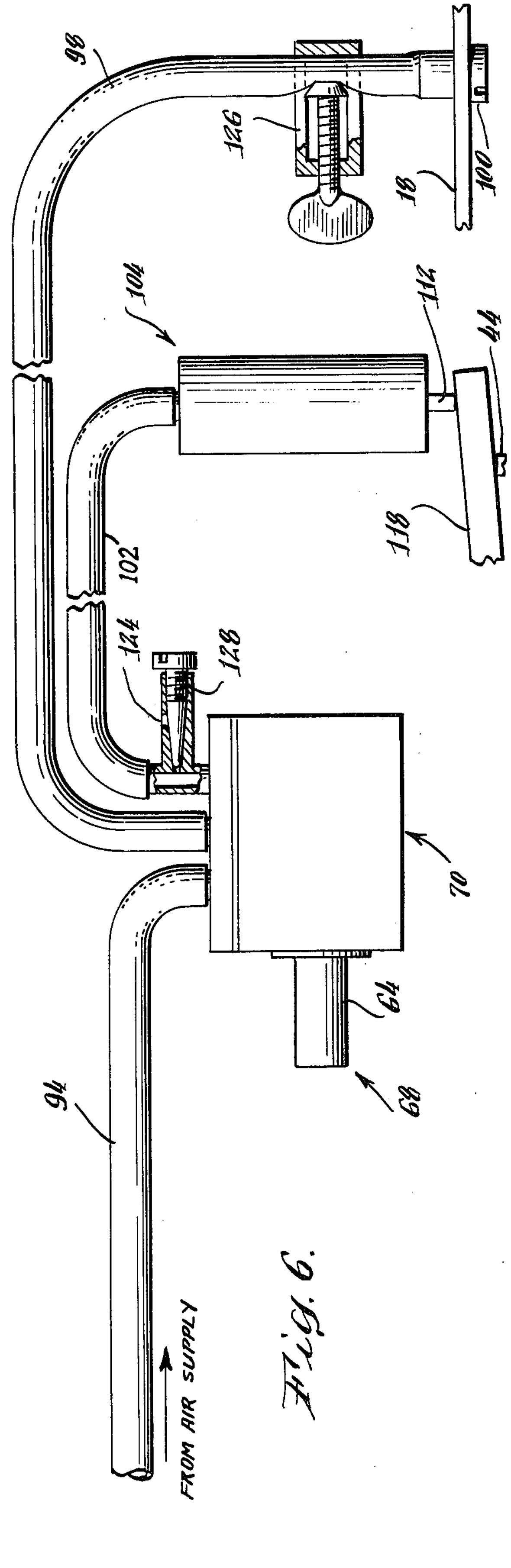
FIG. 6 is a view similar to FIG. 5, partially in section, of a modified pneumatic control means with provision for volume and leakage adjustment.

The behavior of pneumatic actuator 104 in pneumatic control assembly 68 is influenced both by the volume of reservoir tube 98 and the leakage rate of aperture 124. The reservoir volume should be selected to be large enough, in relation to the pressure of air stored therein and the internal volume of tube 102 and actuator 104, to exert a sufficient force on piston 106 to overcome the frictional and spring resistances opposing depression of valve plunger 44. Similarly, the leakage rate through aperture 124 should be large enough to permit rapid recycling of the apparatus, yet not so large as to prevent pneumatic actuator 104 from receiving an adequate supply of pressurized air. In order to provide adjustment of the parameters of reservoir volume and leakage rate, the pneumatic control assembly 68 maybe modified as shown in FIG. 6. Reservoir volume may be conveniently adjusted by means of a tube clamp 126 on reservoir tube 98. Similarly, the leakage rate through aperture 124 may be adjusted by means of a needle valve 128 located between slide valve 70 and tube 102. The desired actuation characteristics of pneumatic actuator 104 may then be achieved by adjusting hose clamp 126 and needle valve 128.

The operation of pneumatic control assembly 68 is believed to be generally as follows. When the high pressure charge of air in reservoir tube 98 is released, it travels as a high pressure wavefront through tube 102 and essentially bypasses aperture 124. The wavefront enters pneumatic actuator 104 and exerts a force against piston 106. The pressure wavefront then reverses direction, travelling backward through tube 102 with considerable damping toward pressure equilibrium. Accordingly, it is desired to place the aperture 124 very close to the input tube 102, so that the initial pressure wavefront will be substantially unaffected by leakage through the aperture and so that a certain amount of pressure reduction will have occurred through leakage by the time the pressure wavefront returns through tube 102, thereby shortening the amount of leakage time.

As has been set forth above, the pneumatically operated stapling apparatus 10 is extremely convenient to use, since it permits the operator's hands to engage the workpiece 12 rather than be required to manipulate any switches or other actuators. Accurate stapling occurs because staples are driven only when the workpiece is in the correct stapling position. No operator coordination between workpiece location and switch actuator is required as in the case of, e.g., a foot operated actuating switch. The apparatus is convenient to use, moreover, because the upward driving stroke for the staples improves the visibility of the face of workpiece 12, and allows accurate alignment of the sheet M on panel P. The apparatus is adaptable to different workpieces, since the spacing between the staple driving mechanism 40 and the backing member 48 can be adjusted, and staple crimping can be provided if desired. Besides being convenient to use, the apparatus 10 is economical and reliable because it can utilize a standard pneumatic stapling device 26, when properly controlled by means of the pneumatic control assembly 68. The pneumatic control assembly 68 is in itself very advantageous, because it requires no separate power sources, is simple in construction, and yet permits automatic and effective control of the pneumatic stapler 26.

Although specific embodiments of the invention have been disclosed herein in detail, it is to be understood that this is for the purpose of illustrating the invention and should not be construed as necessarily limiting the scope of the invention, since it is apparent that many changes can be made to the disclosed structures by those skilled in the art to suit particular applications.

We claim:

1. A pneumatically operated stapling apparatus for inserting a staple into a workpiece, such as a hand held panel and a sheet of material to be mounted thereon, whenever the workpiece is placed in a stapling position between a staple driver and a backing member, comprising:

- a pneumatic stapler of the type having a staple driving mechanism controlled by means positionable either to connect the pneumatic air supply to the staple driving mechanism to advance the staple driver toward the backing member, or to block the air supply and to retract the staple driver;
- a trigger element positioned to be depressed by the workpiece as it is placed in the stapling position; and pneumatic control means actuated by depression of the trigger element for first positioning the stapler control means to cause the staple driver to advance and insert a staple into the workpiece, and then, while the trigger element remains depressed, for automatically changing the position of the stapler control means to retract the staple driver away from the workpiece to be removed from the stapling position to release the trigger element.

2. A pneumatically operated stapling apparatus as claimed in claim 1 wherein the pneumatic control means comprises a pneumatic reservoir, a pneumatic actuator coupled to the stapler control means to control the positioning thereof, and a control valve connected to the trigger element and arranged to connect the pneumatic air supply to the pneumatic reservoir when the trigger element is not depressed, and to connect the pneumatic reservoir with the pneumatic actuator when the trigger element is depressed, the pneumatic circuit which includes the pneumatic reservoir and pneumatic actuator including leakage means for reducing the pressure therein to reset the pneumatic actuator and thereby change the position of the stapler control means to retract the staple driver.

3. A pneumatically operated stapling apparatus as claimed in claim 2 wherein the pneumatic reservoir comprises a tube connected to the control valve and means for closing the tube.

4. A pneumatically operated stapling apparatus as claimed in claim 3 wherein the means for closing the tube is adjustable along the length of the tube to vary the volume of compressed air stored in the tube.

5. A pneumatically operated stapling apparatus as claimed in claim 2 further including means for adjusting said leakage means to vary the rate of air passage therethrough.

6. A pneumatically operated stapling apparatus as claimed in claim 2 wherein said leakage means is located between the control valve and the pneumatic actuator in a location closely adjacent the control valve.

7. A pneumatically operated stapling apparatus as claimed in claim 2 wherein the pneumatic actuator comprises a piston and resilient means biasing the piston against the force of compressed air supplied thereto.

8. A pneumatically operated stapling apparatus as claimed in claim 2 wherein the control valve connected to the trigger element comprises a slide valve including a valve piston moving with the trigger element, and resilient means for biasing the valve piston against depression of the trigger element.

9. A pneumatically operated stapling apparatus as claimed in claim 1 wherein the pneumatic stapler has its staple driving mechanism positioned to advance the staple driver upwardly toward the backing member, whereby staples are driven into the bottom surface of the workpiece, and whereby the top surface of the workpiece is readily visible.

10. A pneumatically operated stapling apparatus as claimed in claim 9 wherein the trigger element is positioned to be depressed horizontally, and is located in a horizontal plane at the top of the staple driving mechanism, whereby horizontal movement of the workpiece into stapling position will depress the trigger element.

11. A pneumatically operated stapling apparatus as claimed in claim 1 further comprising a frame, the pneumatic stapler being supported in said frame with its staple driving mechanism arranged to drive staples upwardly, the backing member being supported in said frame above the staple driving mechanism, and the trigger element being supported by said frame in a horizontal plane at the top of the staple driving mechanism and positioned to be depressed horizontally by the workpiece.

12. A pneumatically operated stapling apparatus as claimed in claim 11 wherein the backing member is adjustably supported in said frame to adjustably locate the backing member in relation to the staple driving mechanism to accommodate workpieces of different thicknesses.

13. A pneumatically operated stapling apparatus as claimed in claim 2 wherein the control valve connected to the trigger element connects to the pneumatic air supply through a tube connecting to the pneumatic stapler.

14. A power operated stapling apparatus comprising:
- a frame;
- a staple driving mechanism supported in said frame and having a staple driver arranged to drive staples upwardly;
- a backing member supported in said frame above the staple driving mechanism;
- a trigger element supported by said frame in a horizontal plane at the top of the staple driving mechanism and positioned to be depressed horizontally by a workpiece moved into the space between the staple driving mechanism and backing member; and
- control means actuated by depression of the trigger element for first causing the staple driver to advance and insert a staple into the workpiece, and then, while the trigger element remains depressed, for automatically retracting the staple driver away from the workpiece to permit the workpiece to be removed and the trigger element to be released.

15. A power operated stapling apparatus as claimed in claim 14 wherein the backing member is adjustably supported in said frame to adjustably locate the backing member in relation to the staple driving mechanism to accommodate workpieces of different thicknesses.

16. A power operated stapling apparatus as claimed in claim 14 wherein the backing member includes means for crimping staples driven thereagainst.

17. A pneumatic stapling method for inserting a staple into a workpiece, such as a hand held panel and a sheet of material to be mounted thereon, whenever the workpiece is placed in a stapling position between a staple driver and a backing member, using a pneumatic stapler of the type having a staple driving mechanism controlled by means positionable either to connect the pneumatic air supply to the staple driving mechanism to advance the staple driver, or to block the air supply and to retract the staple driver, said method for inserting a staple comprising:
- depressing a trigger element with the workpiece as is placed in the stapling position,
- in response to depression of the trigger element, first positioning the stapler control means to cause the staple driver to advance and insert a staple into the workpiece, and
- while the trigger element remains depressed, automatically changing the position of the stapler control means to retract the staple driver away from the workpiece and to permit the workpiece to be removed from the stapling position to release the trigger element.

18. A stapling method as claimed in claim 17 further comprising:

coupling the stapler control means to a pneumatic actuator for controlling the positioning thereof, storing in a pneumatic reservoir a charge of compressed air, performing the step of first positioning the stapler control means to cause the staple driver to advance by connecting the pneumatic reservoir with the pneumatic actuator when the trigger element is depressed, and performing the step of automatically changing the position of the stapler control means by leaking air from the pneumatic circuit including the pneumatic reservoir and pneumatic actuator to reset the pneumatic acutator and thereby change the position of the stapler control means to retract the staple driver.

* * * * *